(No Model.)
N. D. LAMB.
DEVICE FOR DECAPITATING POULTRY.
No. 368,403. Patented Aug. 16, 1887.
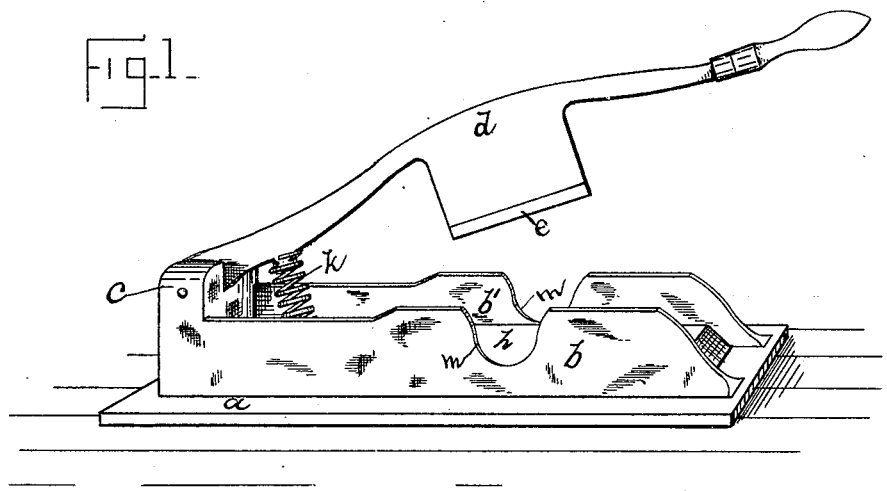
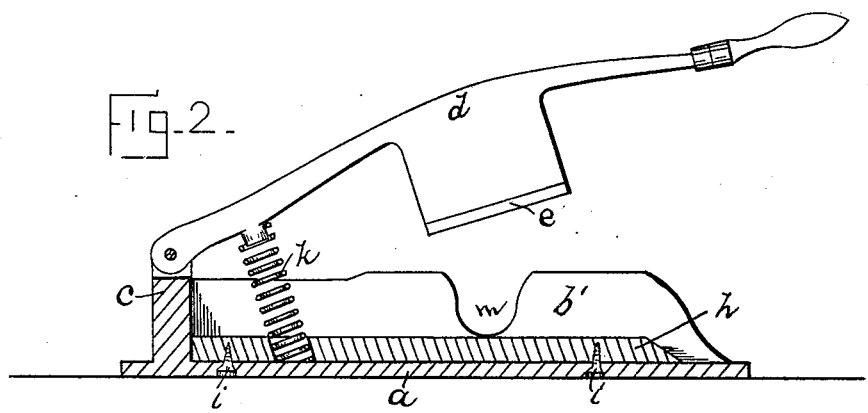
Witnesses
Tyler J. Howard
W. H. Burnett.
Inventor
Noyes D. Lamb
By his Attorney
Frank H. Allen
N. PETERS. Photo-Lithographer, Washington, D. C.

UNITED STATES PATENT OFFICE.

NOYES D. LAMB, OF NORWICH, CONNECTICUT.

DEVICE FOR DECAPITATING POULTRY.

SPECIFICATION forming part of Letters Patent No. 368,403, dated August 16, 1887.

Application filed February 14, 1887. Serial No. 227,471. (No model.)

*To all whom it may concern:*

Be it known that I, NOYES D. LAMB, a citizen of the United States, residing at Norwich, New London county, Connecticut, have made a new and useful invention in Devices for Decapitating Poultry, which invention is fully set forth and described in the following specification, reference being had to the annexed sheet of drawings, in which—

Figure 1 is a perspective view of my device as it appears ready for use. Fig. 2 is a longitudinal sectional view taken at one side of the knife-bar.

My invention consists of a simple mechanical device by means of which the heads of turkeys, hens, and other fowls may be quickly severed from the body, said device being of such form that the effecting of a cut is more completely under the control of the operator than heretofore.

The killing of fowls by the use of an ax and chopping-block, as commonly practiced among poultry-raisers, has objections which it is thought are fully overcome in my present invention—as, for instance, the determined struggles of the fowl to free itself, which render it quite uncertain whether the ax will engage the neck as it descends or (as frequently happens) cut and ruin the body of the fowl. In the killing of a lot of fowls for the market it is desirable that the necks be smoothly cut and left uniform in length; but it is impossible to attain such a result with the use of an ax and block.

Referring to the drawings, the letter $a$ indicates a cast-metal bed-plate of considerable weight, having walls $b$ $b'$ $c$ extending upward therefrom. The end wall, $c$, is slotted to receive a knife-bar, $d$, which is pivoted in said wall, and is either formed of steel with a cutting portion, $e$, or, if preferred, may be of malleable iron and a cutting-blade of steel attached by screws or rivets. Secured to base $a$, between walls $b$ $b'$, is a block of wood, $h$, which receives the impact of the knife in the act of cutting. This block may be quickly removed and a new one substituted, when necessary, by removing the screws $i$ $i$. To hold the knife-bar $d$ in a raised position, as shown in Fig. 1, I have provided a spring, $k$, one of whose ends rests in a hole in block $h$, the upper end being supported by a lug on the knife-bar. Side walls, $b$ $b'$, are cut away adjacent to the knife, as at $m$, the openings so formed being of a size sufficient to receive the neck of the fowl to be killed.

My device is used as follows: The bed-plate $a$ is placed on a block or other solid foundation, and may, if desired, be held rigidly in place by screws or bolts. The fowl to be killed is then grasped by the legs and the neck swung under the knife, where it is adjusted in the openings $m$ and severed by a quick stroke of the knife.

Having thus described my invention, I claim—

1. A device for decapitating fowls, consisting of a base-plate having raised side walls cut away to receive and support the neck of the fowl, and a knife bar pivoted to the end wall of said plate, said elements being combined substantially as described.

2. In combination with a base-plate having side walls cut away to receive the neck of a fowl, a knife-bar pivotally secured to the end wall of said plate, a spring adapted to hold the knife-bar in a raised position, and a block of wood to receive the impact of the knife in the act of effecting a cut, all being substantially as described.

NOYES D. LAMB.

Witnesses:
FRANK H. ALLEN,
TYLER J. HOWARD.